(12) United States Patent
Hironaga et al.

(10) Patent No.: US 9,873,801 B2
(45) Date of Patent: Jan. 23, 2018

(54) ANTIFOULING SHEET AND METHOD FOR PRODUCING SAME

(71) Applicant: LINTEC CORPORATION, Itabashi-ku (JP)

(72) Inventors: Maki Hironaga, Saitama (JP); Yoshitomo Ono, Kawaguchi (JP); Takashi Sugino, Kawaguchi (JP)

(73) Assignee: LINTEC CORPORATION, Itabashi-ku (JP)

(*) Notice: Subject to any disclaimer, the term of this patent is extended or adjusted under 35 U.S.C. 154(b) by 0 days.

(21) Appl. No.: 15/128,044

(22) PCT Filed: Mar. 26, 2015

(86) PCT No.: PCT/JP2015/059446
§ 371 (c)(1),
(2) Date: Sep. 21, 2016

(87) PCT Pub. No.: WO2015/147195
PCT Pub. Date: Oct. 1, 2015

(65) Prior Publication Data
US 2017/0101543 A1 Apr. 13, 2017

(30) Foreign Application Priority Data
Mar. 27, 2014 (JP) .................. 2014-065919

(51) Int. Cl.
*C09D 5/16* (2006.01)
*C09D 183/04* (2006.01)
(Continued)

(52) U.S. Cl.
CPC ......... *C09D 5/1675* (2013.01); *B05D 3/046* (2013.01); *B05D 3/108* (2013.01); *B05D 5/08* (2013.01);
(Continued)

(58) Field of Classification Search
None
See application file for complete search history.

(56) References Cited

U.S. PATENT DOCUMENTS 4,943,620 A * 7/1990 Gomyo .................. C08G 77/08
525/474
6,248,168 B1 6/2001 Takeshita et al.
(Continued)

FOREIGN PATENT DOCUMENTS

EP 1708038 A2 10/2006
JP 11-204513 7/1999
(Continued)

OTHER PUBLICATIONS

International Search Report issued Jun. 23, 2015, in PCT/JP15/059446 filed Mar. 26, 2015.
(Continued)

*Primary Examiner* — Erma Cameron
(74) *Attorney, Agent, or Firm* — Oblon, McClelland, Maier & Neustadt, L.L.P.

(57) ABSTRACT

Provided is an antifouling sheet having an antifouling layer formed of an antifouling layer-forming composition containing a specific tetrafunctional silane compound (A) and a specific trifunctional silane compound (B) wherein the content of the component (B) is 8 to 90 mol % relative to 100 mol % of the component (A), and the antifouling layer is a layer formed by drying and curing a coating film formed of the antifouling layer-forming composition, in an ammonia atmosphere. Also provided is a method for producing the antifouling sheet. The antifouling sheet is provided with an antifouling layer having good surface state and curability, has a large slip acceleration for water droppings, thereby having excellent water repellency that makes water droplets slip off instantly, and has excellent interlayer adhesiveness.

13 Claims, 2 Drawing Sheets

(51) Int. Cl.
    *B05D 3/04*         (2006.01)
    *B05D 3/10*         (2006.01)
    *B05D 5/08*         (2006.01)
    *B05D 7/00*         (2006.01)
    *B05D 5/00*         (2006.01)

(52) U.S. Cl.
    CPC ............. *B05D 7/52* (2013.01); *C09D 183/04* (2013.01); *B05D 5/00* (2013.01); *C09D 5/16* (2013.01)

(56) References Cited

U.S. PATENT DOCUMENTS

| | | | | |
|---|---|---|---|---|
| 6,558,804 | B2* | 5/2003 | Sato | C08G 77/24 |
| | | | | 106/287.14 |
| 6,605,683 | B1* | 8/2003 | Zhang | C08G 77/045 |
| | | | | 428/447 |
| 2001/0017103 | A1 | 8/2001 | Takeshita et al. | |
| 2002/0037417 | A1* | 3/2002 | Sato | C08G 77/24 |
| | | | | 428/447 |
| 2003/0196595 | A1 | 10/2003 | Takeshita et al. | |
| 2004/0156996 | A1 | 8/2004 | Takeshita et al. | |
| 2006/0286813 | A1 | 12/2006 | Meredith et al. | |
| 2006/0292298 | A1 | 12/2006 | Takeshita et al. | |
| 2007/0148435 | A1 | 6/2007 | Meredith et al. | |
| 2010/0009188 | A1* | 1/2010 | Xin | B05D 7/06 |
| | | | | 428/402 |
| 2011/0223329 | A1 | 9/2011 | Meredith et al. | |
| 2012/0282458 | A1 | 11/2012 | Takeda et al. | |

FOREIGN PATENT DOCUMENTS

| | | |
|---|---|---|
| JP | 2005-162543 | 6/2005 |
| JP | 2007-511356 | 5/2007 |
| JP | 2010-285574 | 12/2010 |
| WO | WO2015/147196 A1 | 1/2015 |

OTHER PUBLICATIONS

Extended European Search Report dated Nov. 6, 2017, in European Patent Application No. 15770186.3.

* cited by examiner

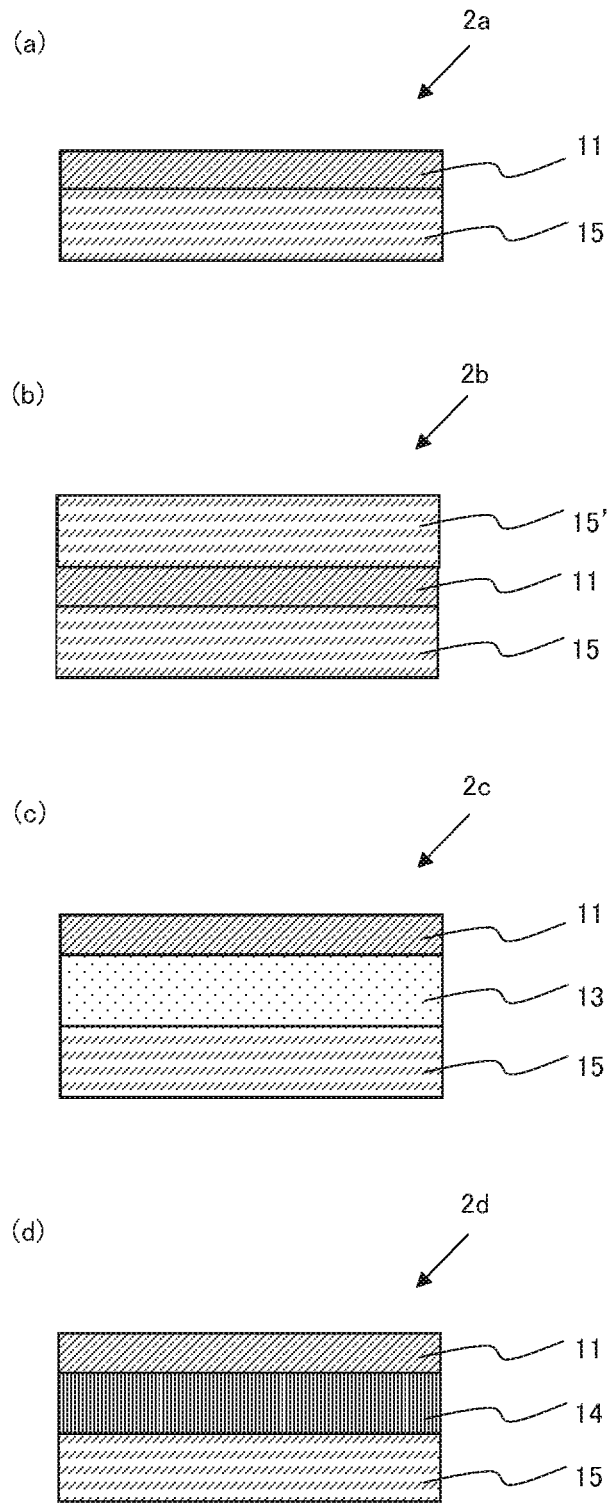

ANTIFOULING SHEET AND METHOD FOR PRODUCING SAME

TECHNICAL FIELD

The present invention relates to an antifouling sheet and a method for producing the same.

BACKGROUND ART

In general, it is desirable that water droplets, stains and the like that may hinder vision do not adhere to the surfaces of windows for buildings, windows for automobiles, windshields for cars, airplanes, ships and the like, aquariums, ship bottom windows, undersea lives adhesion preventing films for ship bottoms, road panels such as soundproof walls and the like, mirrors installed in bathrooms and the like, and molded articles such as glass chambers, glass accessories and the like.

By coating the surfaces of such molded articles with a coating film formed of an antifouling substance, or by sticking an antifouling sheet thereto, the surfaces can be given water repellency and antifouling property.

It is known that, for imparting water repellency to molded articles, a layer that contains a fluorine-containing compound such as a fluororesin or the like is formed on the surfaces of molded articles.

For example, PTL 1 discloses a water-repellent film-coated article, in which glass or the like serving as a substrate therein is coated with a laminate having an underlayer formed of an inorganic compound and a water-repellent film formed of a fluorine-containing compound, which coats the surface of the underlayer.

CITATION LIST

Patent Literature

PTL 1: JP 2010-285574A

SUMMARY OF INVENTION

Technical Problem

However, the water-repellent film-coated article described in PTL 1 has a water-repellent film formed of a fluorine-containing compound and is therefore unfavorable from the viewpoint of environmental protection.

In general, a water-repellent film formed of a fluorine-containing compound has a small slip acceleration for water droplets, and therefore, when water droplets have adhered to the surface of the water-repellent film, the film tends to take much time before the water droplets could slip off therefrom. Consequently, the water-repellent film-coated article described in PTL 1 is unsuitable to applications that are required to have a characteristic capable of instantaneously slipping off water droplets adhering thereto.

Further, in an antifouling sheet having water repellency and antifouling property, the surface condition and the curability of the layer to impart water repellency and antifouling property are good, and the sheet is also required to have good interlayer adhesiveness.

An object of the present invention is to provide an antifouling sheet which is provided with an antifouling layer having good surface state and curability, which has a large slip acceleration for water droplets and therefore has excellent water repellency that makes water droplets slip off instantly, and which is excellent in interlayer adhesiveness.

Solution to Problem

The present inventors have found that an antifouling sheet having an antifouling layer that is formed by drying and curing a coating film formed of a composition containing two types of silane compounds each having a specific structure in a specific ratio, in an ammonia atmosphere can solve the above-mentioned problems, and have completed the present invention.

Specifically, the present invention provides the following [1] to [13].

[1] An antifouling sheet having an antifouling layer formed of an antifouling layer-forming composition containing a silane compound (A) represented by the following formula (a) and a silane compound (B) represented by the following formula (b), wherein:
the content of the component (B) in the antifouling layer-forming composition is 8 to 90 mol % relative to 100 mol % of the component (A), and
the antifouling layer is a layer formed by drying and curing a coating film formed of the antifouling layer-forming composition in an ammonia atmosphere:

$$Si(OR^1)_p(X^1)_{4-p} \quad \text{Formula (a)}$$

wherein $R^1$ represents an alkyl group having 1 to 6 carbon atoms, $X^1$ represents a halogen atom, when the formula has plural $R^1$'s and $X^1$'s, the plural $R^1$'s and $X^1$'s each may be the same as or different from each other, p indicates an integer of 0 to 4,

$$R^2Si(OR^3)_q(X^2)_{3-q} \quad \text{Formula (b)}$$

wherein $R^2$ represents an unsubstituted or substituted alkyl group having 4 to 14 carbon atoms, $R^3$ represents an alkyl group having 1 to 6 carbon atoms, $X^2$ represents a halogen atom, when the formula has plural $R^3$'s and $X^2$'s, the plural $R^3$'s and $X^2$'s each may be the same as or different from each other, q indicates an integer of 0 to 3.

[2] The antifouling sheet according to the above [1], wherein the antifouling layer is a layer formed by drying and curing a coating film formed of the antifouling layer-forming composition, in an atmosphere having an ammonia concentration of 0.3 ppm or more.

[3] The antifouling sheet according to the above [1] or [2], wherein the component (A) in the antifouling layer-forming composition contains a silane compound of the formula (a) where p is 4.

[4] The antifouling sheet according to any one of the above [1] to [3], wherein the component (B) in the antifouling layer-forming composition contains a silane compound of the formula (b) where q is 3.

[5] The antifouling sheet according to any one of the above [1] to [4], wherein the antifouling layer-forming composition further contains an acid catalyst (C).

[6] The antifouling sheet according to any one of the above [1] to [5], which has a substrate and the antifouling layer.

[7] The antifouling sheet according to any one of the above [1] to [6], which has a configuration where an interlayer containing a (poly)silazane compound is layered on a substrate and the antifouling layer is layered on the surface of the interlayer.

[8] The antifouling sheet according to any one of the above [1] to [7], wherein the ammonia concentration detected from the antifouling sheet is 0.3 ppm or more.

[9] A method for producing an antifouling sheet having the following steps (1) to (3):

Step (1): a step of preparing an antifouling layer-forming composition containing 8 to 90 mol % of a silane compound (B) represented by the following formula (b) relative to 100 mol % of a silane compound (A) represented by the following formula (a),

Formula (a)

wherein $R^1$ represents an alkyl group having 1 to 6 carbon atoms, $X^1$ represents a halogen atom, when the formula has plural $R^1$'s and $X^1$'s, the plural $R^1$'s and $X^1$'s each may be the same as or different from each other, and p indicates an integer of 0 to 4,

Formula (b)

wherein $R^2$ represents an unsubstituted or substituted alkyl group having 4 to 14 carbon atoms, $R^3$ represents an alkyl group having 1 to 6 carbon atoms, $X^2$ represents a halogen atom, when the formula has plural $R^3$'s and $X^2$'s, the plural $R^3$'s and $X^2$'s each may be the same as or different from each other, and q indicates an integer of 0 to 3, Step (2): a step of forming a coating film using the antifouling layer-forming composition prepared in the step (1), Step (3): a step of forming an antifouling layer by drying and curing the coating film formed in the step (2), in an ammonia atmosphere.

[10] The method for producing an antifouling sheet according to the above [9], wherein the ammonia concentration in the ammonia atmosphere in which the step (3) is carried out is 0.3 ppm or more.

[11] The method for producing an antifouling sheet according to the above [9] or [10], wherein the antifouling layer-forming composition further contains an acid catalyst (C).

[12] The method for producing an antifouling sheet according to the above [11], wherein the acid catalyst (C) contains one or more selected from the group consisting of hydrochloric acid, phosphoric acid, acetic acid, formic acid, sulfuric acid, methanesulfonic acid, hydrobromic acid, p-toluenesulfonic acid and trifluoroacetic acid.

[13] The method for producing an antifouling sheet according to the above [11] or [12], wherein the total content of the component (A), the component (B) and the component; (C) in the antifouling layer-forming composition is 50 to 100% by mass relative to the total amount of the antifouling layer-forming composition.

Advantageous Effects of Invention

The antifouling sheet of the present invention is provided with an antifouling layer having good surface state and curability, has a large slip acceleration for water droplets, thereby having excellent water repellency that makes water droplets slip off instantly, and has excellent interlayer adhesiveness.

BRIEF DESCRIPTION OF DRAWINGS

FIG. 2 illustrates cross-sectional views of antifouling sheets not having a substrate, showing one example of a configuration of an antifouling sheet of the present invention.

DESCRIPTION OF EMBODIMENTS

Figure 1:
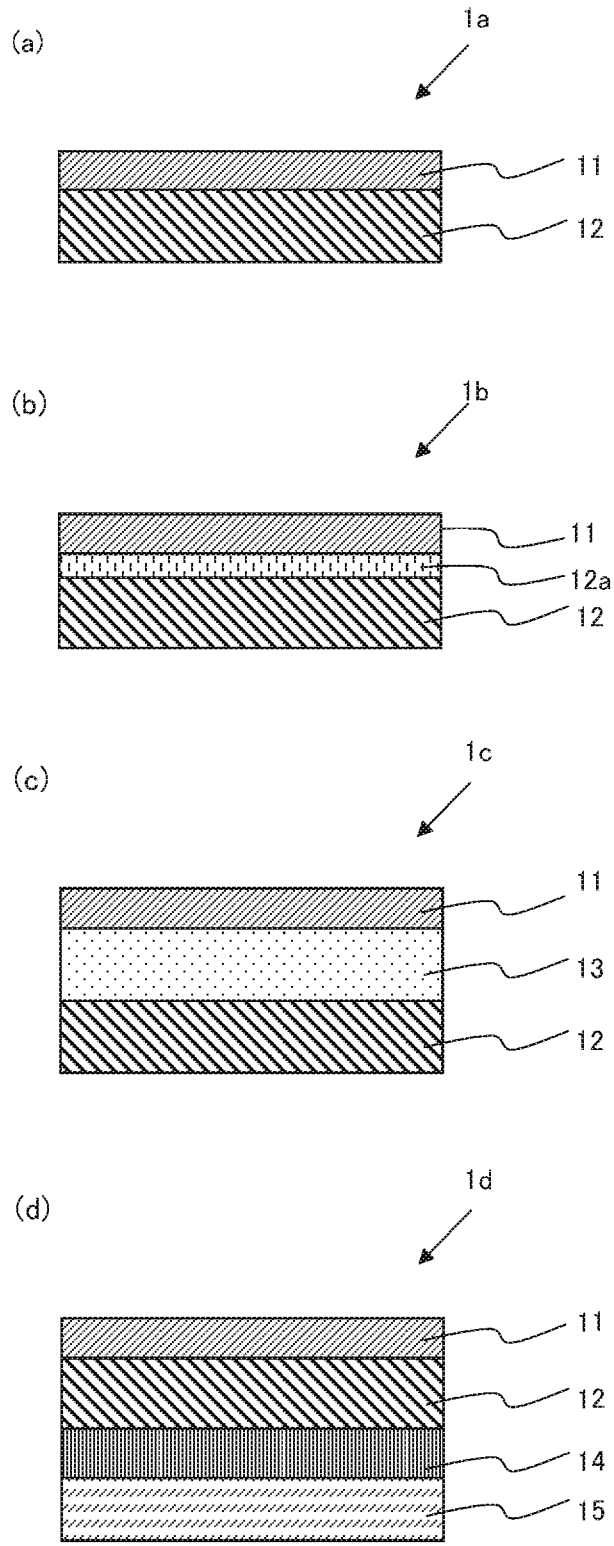
FIG. 1 illustrates cross-sectional views of antifouling sheets each having a substrate, showing one example of a configuration of an antifouling sheet of the present invention.

In this description, "number-average molecular weight (Mn)" is a standard polystyrene-equivalent value measured through gel permeation chromatography (GPC), specifically a value measured according to the method described in the section of Examples.

In this description, for example, "(poly)silazane compound" means both of "silazane compound" and "polysilazane compound", and the same shall apply to the other similarity terms.

[Configuration of Antifouling Sheet]

The antifouling sheet of the present invention is not specifically limited so far as it has a configuration having an antifouling layer.

FIG. 1 and FIG. 2 each include cross-sectional views of an antifouling sheet, each showing an example of a configuration of an antifouling sheet of the present invention.

Examples of a configuration of the antifouling sheet of the present invention include antifouling sheets 1a, 1b, 1c and 1d each having a substrate 12, as shown by FIGS. 1(a) to (d).

From the viewpoint of protecting the surface of the antifouling layer in storing the antifouling sheet, a release material may be further provided on the exposed surface of the antifouling layer 11 that the antifouling sheets 1a, 1b, 1c and 1d have.

The antifouling sheet 1a shown by FIG. 1(a) has an antifouling layer 11 on a substrate 12.

The antifouling sheet of the present invention may use as a substrate a primer layer-having substrate, as shown by FIG. 1(b), for improving the adhesiveness between the substrate 12 and the antifouling layer 11 thereby to be an antifouling sheet 1b provided with a primer layer 12a between the substrate 12 and the antifouling layer 11.

The antifouling sheet 1c shown by FIG. 1(c) is so configured that a (poly)silazane compound-containing interlayer 13 is layered on the substrate 12, and the antifouling layer 11 is layered on the surface of the interlayer 13. Providing the interlayer 13 further betters the curability of the antifouling layer 11.

In the case where the antifouling sheet of the present invention has an interlayer, the antifouling sheet preferably has a configuration of direct layering of the interlayer 13 and the antifouling layer 11, like the antifouling sheet 1c shown by FIG. 1(c) or the antifouling sheet 2c shown by FIG. 2(c) to be mentioned hereinunder.

The antifouling sheet 1d shown by FIG. 1(d) is so configured as to have an adhesive layer 14 and a release material 15 on the surface opposite to that having the antifouling layer 11 of the substrate 12 of the antifouling sheet 1a.

The antifouling sheet of the present invention may be one not having a substrate.

Other examples of the configuration of the antifouling sheet not having a substrate include substrateless antifouling sheets 2a, 2b, 2c and 2d, as shown by FIGS. 2(a) to (d).

The antifouling sheet 2a shown by FIG. 2(a) has a configuration where an antifouling layer 11 is layered on a release material 15; and the antifouling sheet 2b shown by FIG. 2(b) has a configuration where an antifouling layer 11 is sandwiched between two release materials 15 and 15'.

The antifouling sheet 2c shown by FIG. 2(c) has a configuration where a (poly)silazane compound-containing interlayer 13 is layered on a release material 15, and an antifouling layer 11 is layered on the surface of the interlayer 13.

The antifouling sheet 2d shown by FIG. 2(d) has a configuration where an adhesive layer 14 is provided between a release material 15 and an antifouling layer 11.

From the viewpoint of protecting the antifouling layer during storage, an additional release material may be provided on the exposed surface of the antifouling layer 11 that the antifouling sheets 2c and 2d shown by FIGS. 2(c) and (d) have.

Each layer that the antifouling sheet of the present invention has is described below.

[Antifouling Layer]

The antifouling layer that the antifouling sheet of the present invention has is a layer formed of an antifouling layer-forming composition that contains a silane compound (a) represented by the above formula (a) and a silane compound (B) represented by the above formula (b), and is a layer formed by drying and curing the coating film formed of the antifouling layer-forming composition, in an ammonia atmosphere.

The antifouling layer-forming composition preferably contains an acid catalyst (C) along with the component (A) and the component (B) therein, and within a range not detracting from the advantageous effects of the present invention, the composition may contain any other additives than the components (A) to (C).

The antifouling layer of the antifouling sheet of the present invention is a layer formed of an antifouling layer-forming composition that contains the component (A) and the component (B) each having a specific structure, in a predetermined ratio, and therefore, the antifouling layer has excellent curability and can provide an antifouling sheet having a large slip acceleration for water droplets and therefore having excellent water repellency that makes water droplets slip off instantly.

Regarding the reason, the present inventors have considered that there would be some factors in the structure of the polymer formed through polycondensation of the component (A) and the component (B) in the process of forming the antifouling layer from the antifouling layer-forming composition.

Namely, the present inventors have considered that, in the structure of the polymer, the presence of the alkyl group in the unit derived from the component (B) ($R^2$ in the formula (b)) would contribute toward improving the water repellency of the formed antifouling layer, but when the unit derived from the component (B) becomes dense, the reactivity would lower and the curability of the antifouling layer would tend to lower.

Based on the consideration, the present inventors have tried introducing a unit derived from the component (A) that plays a role of a spacer, between the units derived from the component (B), thereby forming a polymer for the antifouling layer where the distance between the units derived from the component (B) is controlled, and accordingly have considered that the mobility of the alkyl group in the unit derived from the component (B) could be thereby controlled and both the water repellency and the curability of the antifouling layer could be improved, and as a result, have completed the present invention.

Consequently, the antifouling layer that the antifouling sheet of the present invention has must be a layer formed of the antifouling layer-forming composition containing the component (A) and the component (B) each having a specific structure, in a predetermined ratio.

The antifouling layer that the antifouling sheet of the present invention has is a layer formed by drying and curing a coating film formed of the antifouling layer-forming composition, in an ammonia atmosphere.

By drying the coating film in an ammonia atmosphere, it is considered that ammonia could function as a catalyst for polycondensation of the component (A) and the component (B) and, as a result, the curability of the formed antifouling layer could be thereby improved. On the other hand, an antifouling layer formed by drying the coating film in an environment where ammonia is not detected is often insufficient in curability.

The ammonia concentration in the ammonia atmosphere in drying the coating film is, from the viewpoint of providing the antifouling sheet having the antifouling layer excellent in curability, preferably 0.3 ppm or more, more preferably 0.5 ppm or more, even more preferably 0.55 ppm or more, still more preferably 0.6 ppm or more.

The upper limit of the ammonia concentration is not specifically defined, but from the viewpoint of safety and handleability, the ammonia concentration is preferably 50 ppm or less, more preferably 30 ppm or less.

In the present invention, the value of the ammonia concentration in the ammonia atmosphere means the value measured according to the method described in the section of Examples.

The thickness of the antifouling layer is, from the viewpoint of providing the antifouling sheet having excellent antifouling performance and excellent water repellency capable of securing a large slip acceleration for water droplets and capable of making water droplets slip off instantly, preferably 0.01 to 40 μm, more preferably 0.05 to 25 μm, even more preferably 0.10 to 15 μm, further more preferably 0.30 to 5 μm.

<Component (A): Silane Compound Represented by Formula (a)>

The antifouling layer-forming composition that is a forming material for the antifouling layer contains a silane compound represented by the following formula (a).

$$Si(OR^1)_p(X^1)_{4-p} \qquad \text{Formula (a)}$$

wherein $R^1$ represents an alkyl group having 1 to 6 carbon atoms, $X^1$ represents a halogen atom, when the formula has plural $R^1$'s and $X^1$'s, the plural $R^1$'s and $X^1$'s each may be the same as or different from each other, p indicates an integer of 0 to 4.

Examples of the alkyl group that may be selected for $R^1$ include a methyl group, an ethyl group, an n-propyl group, an isopropyl group, an n-butyl group, an s-butyl group, an isobutyl group, a t-butyl group, an n-pentyl group, an n-hexyl group, a neopentyl group, a methylpentyl group, etc.

The alkyl group that may be selected for may be any of a linear or branched one, but is preferably a linear one.

The halogen atom that may be selected for $X^1$ includes a fluorine atom, a chlorine atom, a bromine atom and an iodine atom, but is preferably a chlorine atom.

One alone or two or more of the silane compounds represented by the above-mentioned formula (a) may be used either singly or as combined.

Preferably, the component (A) contains a silane compound of the formula (a) where p is 4.

<Component (B): Silane Compound Represented by Formula (b)>

The antifouling layer-forming composition that is a forming material for the antifouling layer contains a silane compound represented by the following formula (b), along with the silane compound of the component (A).

$$R^2Si(OR^3)_q(X^2)_{3-q} \qquad \text{Formula (b)}$$

wherein $R^2$ represents an unsubstituted or substituted alkyl group having 4 to 14 carbon atoms, $R^3$ represents an alkyl group having 1 to 6 carbon atoms, $X^2$ represents a halogen atom, when the formula has plural $R^3$'s and $X^2$'s, the plural $R^3$'s and $X^2$'s each may be the same as or different from each other, q indicates an integer of 0 to 3.

The carbon number of the alkyl group that may be selected for $R^2$ is, from the viewpoint of improving the surface state and the curability of the antifouling layer to be formed, preferably 4 to 14, more preferably 5 to 13, even more preferably 6 to 12, further more preferably 6 to 10.

The above carbon number does not include the carbon number of the substituent that the alkyl group capable of being selected for $R^2$ may have.

When the carbon number of the alkyl group that may be selected for $R^2$ is less than 4, cissing may occur when the resultant antifouling layer-forming composition is applied, and therefore the surface state of the antifouling layer formed of the composition is poor.

In turn, when the carbon number of the alkyl group that may be selected for $R^2$ is more than 14, the curability of the antifouling layer to be formed of the resultant antifouling layer-forming composition is poor. With the increase in the carbon number of the alkyl group, the resultant antifouling layer-forming composition comes to gel more readily and the surface state of the antifouling layer formed of the composition tends to worsen.

Examples of the alkyl group that may be selected for $R^2$ include an n-butyl group, an s-butyl group, an isobutyl group, a t-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, a methylpentyl group, a pentylhexyl group, a butylpentyl group, a 2-ethylhexyl group, etc.

The alkyl group that may be selected for $R^2$ may be any of a linear alkyl group or a branched alkyl group, but is, from the viewpoint of forming the antifouling layer having good surface state and curability, preferably a linear alkyl group.

The alkyl group that may be selected for $R^2$ may further have a substituent.

Examples of the substituent include a halogen atom selected from a fluorine atom, a chlorine atom, a bromine atom and an iodine atom; a hydroxyl group; a nitro group; an amino group; a cycloalkyl group having 3 to 10 ring carbon atoms; an aryl group having 6 to 12 ring carbon atoms; etc. These substituents may further be substituted with any other substituent.

However, the alkyl group that may be selected for $R^2$ is preferably unsubstituted.

The alkyl group that may be selected for $R^3$ includes those mentioned for the alkyl group that may be selected for in the above-mentioned formula (a).

The halogen atom that may be selected for $X^2$ includes those mentioned for the halogen atom that may be selected for $X^1$ in the above-mentioned formula (a).

One alone or two or more of the silane compounds represented by the above-mentioned formula (b) may be used either singly or as combined.

Preferably, the component (B) contains a silane compound of the formula (b) where q is 3.

In the present invention, the content of the component (B) in the antifouling layer-forming composition is 8 to 90 mol % relative to 100 mol % of the component (A).

When the content of the component (B) is less than 8 mol %, the formed antifouling layer has a small slip acceleration for water droplets and takes much time for slipping water droplets, and is therefore poor in water repellency. In addition, when the resultant antifouling layer-forming composition is applied, cissing may readily occur and the antifouling layer to be formed of the composition tends to have a poor surface state.

In turn, when the content of the component (B) is more than 90 mol %, the curability of the antifouling layer to be formed of the resultant antifouling layer-forming composition is poor.

From the viewpoint of forming the antifouling layer having an increased slip acceleration for water droplets to exhibit excellent water repellency capable of making water droplets slip off instantly, and from the viewpoint of bettering the surface state of the antifouling layer to be formed, the content of the component (B) relative to 100 mol % of the component (A) in the antifouling layer-forming composition is preferably 10 mol % or more, more preferably 12 mol % or more, even more preferably 16 mol % or more, further more preferably 20 mol % or more.

In turn, from the viewpoint of improving the curability of the antifouling layer to be formed, the content of the component (B) relative to 100 mol % of the component (A) in the antifouling layer-forming composition is preferably 80 mol % or less, more preferably 70 mol % or less, even more preferably 60 mol % or less, further more preferably 55 mol % or less, still further more preferably 50 mol % or less, still further more preferably 45 mol % or less.

<Component (C): Acid Catalyst>

From the viewpoint of improving the curability of the antifouling layer to be formed, the antifouling layer-forming composition that is a forming material for the antifouling layer preferably contains an acid catalyst (C).

The acid component (C), when contained in the antifouling layer-forming composition, can accelerate hydrolysis of the reactive functional groups that the component (A) and the component (B) have, and therefore can accelerate polycondensation between the component (A) and the component (B) to form the antifouling layer having excellent curability.

The acid catalyst (C) is not specifically limited so far as it is a component having an effect capable of accelerating the hydrolysis of the reactive functional groups that the component (A) and the component (B) have, but from the viewpoint of forming the antifouling layer having excellent curability, preferably contains one or more selected from the group consisting of hydrochloric acid, phosphoric acid, acetic acid, formic acid, sulfuric acid, methanesulfonic acid, hydrobromic acid, p-toluenesulfonic acid and trifluoroacetic acid, and more preferably contains hydrochloric acid.

The content of the component (C) in the antifouling layer-forming composition is, from the viewpoint of improving the curability of the antifouling layer to be formed, preferably 0.001 to 1.000 mol % relative to 100 mol % of the total amount of the component (A) and the component (B), more preferably 0.005 to 0.500 mol %, even more preferably 0.010 to 0.100 mol %, still more preferably 0.020 to 0.070 mol %.

<Other Additives>

The antifouling layer-forming composition may contain any other additive in addition to the above-mentioned components (A) to (C), within a range not detracting from the advantageous effects of the present invention.

Examples of the other additives include a resin component, a curing agent, an anti-aging agent, a light stabilizer, a flame retardant, an electroconductive agent, an antistatic agent, a plasticizer, etc.

The total content of the component (A), the component (B) and the component (C) in the antifouling layer-forming composition is preferably 50 to 100% by mass relative to the total amount (100% by mass) of the antifouling layer-forming composition, more preferably 65 to 100% by mass, even more preferably 80 to 100% by mass, further more preferably 90 to 100% by mass.

The content of the fluorine-containing compound in the antifouling layer-forming composition is, from the viewpoint of the environment, preferably less than 10% by mass relative to the total amount (100% by mass) of the antifouling layer-forming composition, more preferably less than 5% by mass, even more preferably less than 1% by mass, still more preferably less than 0.01% by mass.

[Substrate]

Examples of the substrate for use n the present invention include a paper substrate, a resin film or sheet, a substrate prepared by laminating a paper substrate with a resin, etc., and can be suitably selected in accordance with the use of the antifouling sheet.

Examples of paper that constituting a paper substrate include thin paper, medium-quality paper, wood-free paper, impregnated paper, coated paper, art paper, parchment paper, glassine paper, etc.

Examples of the resin to constitute a resin film or sheet include polyolefin resins such as polyethylene, polypropylene, etc.; vinylic resins such as polyvinyl chloride, polyvinylidene chloride, polyvinyl alcohol, ethylene-vinyl acetate copolymer, ethylene-vinyl alcohol copolymer, etc.; polyester resins such as polyethylene terephthalate, polybutylene terephthalate, polyethylene naphthalate, etc.; polystyrene; acrylonitrile-butadiene-styrene copolymer; cellulose triacetate; polycarbonate; urethane resins such as polyurethane, acryl-modified polyurethane, etc.

The substrate prepared by laminating a paper substrate with a resin includes laminate paper prepared by laminating the above-mentioned, paper substrate with a thermoplastic resin such as polyethylene, etc.

Among these substrates, a resin film or sheet is preferred, a film or sheet formed of a polyester resin is more preferred, and a film or sheet formed of polyethylene terephthalate (PET) is even more preferred.

As the substrate for use in the present invention, from the viewpoint of improving the adhesiveness thereof to interlayer, a primer layer-having substrate prepared by providing a primer layer on the surface of a substrate selected from the above-mentioned paper substrate, resin film or sheet, and laminated substrate prepared by laminating a paper substrate with a resin is preferred.

Examples of the component to constitute the primer layer include a polyester resin, a urethane resin, a polyester urethane resin, an acrylic resin, etc. One alone or two or more of these components may be used either singly or as combined.

The thickness of the substrate is suitably defined depending on the use of the antifouling sheet, and is, from the viewpoint of handleability and economic efficiency, preferably 10 to 250 μm, more preferably 15 to 200 μm, even more preferably 20 to 150 μm.

In the case where a primer layer-having substrate is used, the above range is a range of the total thickness of the primer layer-having substrate including the thickness of the primer layer.

The substrate may further contain a UV absorbent, a light stabilizer, an antioxidant, an antistatic agent, a slip agent, an antiblocking agent, a colorant, etc.

[Release Material]

The release material for use in the present invention includes a release sheet prepared through double-side release treatment, a release sheet prepared by single-side release treatment, etc., and one prepared by coating a substrate for a release material with a release agent or the like is usable.

Examples of the substrate for the release material include a paper substrate, a resin film or sheet, a substrate prepared by laminating a paper substrate with a resin and the like that are usable as the substrate for the antifouling sheet of the present invention.

Examples of the release agent include a silicone resin, an olefin resin, an isoprene resin, a rubber elastomer such as a butadiene resin, a long-chain alkyl resin, an alkyd resin, a fluororesin, etc.

The thickness of the release material is not specifically limited, but is preferably 10 to 200 μm, more preferably 25 to 150 μm.

[Interlayer]

Preferably, the antifouling sheet of the present invention further has an interlayer containing a (poly)silazane compound, and more preferably has a configuration in which the antifouling layer is directly layered on the surface of the interlayer.

The (poly)silazane compound to be contained in the interlayer has a property to react with moisture in air to induce deammoniation, and while generating ammonia, it forms a glassy coating film containing $SiO_2$. Accordingly, immediately after formation of an interlayer containing a (poly)silazane compound, ammonia evaporates continuously from the interlayer.

Given the situation, it is considered that direct layering of the antifouling layer on the surface of the interlayer could provide a condition where ammonia is continuously supplied to the antifouling layer, and as described above, the curability of the antifouling layer could be more improved. In addition, it is considered that a polymer formed through polymerization of the two types of silane compounds in the antifouling layer could readily bond to the (poly)silazane compound in the interlayer, and bonding of the two compounds could improve the interlayer adhesiveness between the antifouling layer and the interlayer.

Preferably, the antifouling layer is a layer formed by drying and curing the coating film formed of the antifouling layer-forming composition, on the surface of the interlayer.

As described above, ammonia is released from the interlayer therefore providing the condition of "ammonia atmosphere", and it is considered that, under the condition, the coating film could be cured to give the antifouling layer excellent in curability.

The interlayer that the antifouling sheet of the present invention has is a layer containing a (poly)silazane compound, but within a range not detracting from the advantageous effects of the present invention, the interlayer may further contain any other additive.

The thickness of the interlayer is preferably 0.02 to 500 μm, more preferably 0.05 to 100 μm, even more preferably 0.1 to 25 μm, further more preferably 0.3 to 15 μm.

When the thickness of the interlayer is 0.02 μm or more, the curability of the antifouling layer formed on the interlayer can be improved. In addition, the interlayer adhesiveness between the interlayer and the antifouling layer can be bettered.

On the other hand, when the thickness of the interlayer is 500 μm or less, the interlayer can be prevented from being cracked even when the antifouling sheet is bent, and therefore the sheet can be a flexible antifouling sheet. In addition, visibility degradation owing to the refractive index difference from the antifouling layer can be prevented.

<(Poly)silazane Compound>

The (poly)silazane compound is not specifically limited so far as it is a compound having a silicon-nitrogen bond, but is preferably a compound having a repeating unit represented by the following formula (1).

The compound may be a linear compound having a linear structure containing a repeating unit represented by the following general formula (1), or may be a cyclic compound having a cyclic structure containing a repeating unit represented by the following general formula (1).

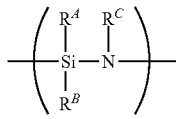

(1)

wherein $R^A$, $R^B$ and $R^C$ each independently represent a hydrogen atom, an alkyl group, a cycloalkyl group, an alkenyl group, an aryl group or an alkylsilyl group. The alkyl group, the cycloalkyl group, the alkenyl group, the aryl group and the alkylsilyl group may further have a substituent.

Examples of the alkyl group that may be selected for $R^A$, $R^B$ and $R^C$ include a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group, an n-octyl group, a 2-ethylhexyl group, etc.

Among these alkyl groups, an alkyl group having 1 to 10 carbon atoms is preferred, an alkyl group having 1 to 6 carbon atoms is more preferred, and an alkyl group having 1 to 3 carbon atoms is even more preferred.

Examples of the cycloalkyl group that may be selected for $R^A$, $R^B$ and $R^C$ include a cyclopentyl group, a cyclohexyl group, a methylcyclohexyl group, etc.

Among these cycloalkyl groups, a cycloalkyl group having 3 to 12 ring carbon atoms is preferred, and a cycloalkyl group having 6 to 10 ring carbon atoms is more preferred.

Examples of the alkenyl group that may be selected for $R^A$, $R^B$ and $R^C$ include a vinyl group, a 1-propenyl group, a 2-propenyl group, a 1-butenyl group, a 2-butenyl group, a 3-butenyl group, etc.

Among these alkenyl groups, an alkenyl group having 2 to 10 carbon atoms is preferred, and an alkenyl group having 2 to 5 carbon atoms is more preferred.

Examples of the aryl group that may be selected for $R^A$, $R^B$ and $R^C$ include a phenyl group, a biphenyl group, a triphenyl group, a naphthyl group, an anthracenyl group, etc.

Among these aryl groups, an aryl group having 6 to 12 carbon atoms is preferred, and a phenyl group is more preferred.

Examples of the alkylsilyl group that may be selected for $R^A$, $R^B$ and $R^C$ include a trimethylsilyl group, a triethylsilyl group, a tri-n-propylsilyl group, a triisopropylsilyl group, a tri-t-butylsilyl group, a methyldiethylsilyl group, a dimethylsilyl group, a diethylsilyl group, a methylsilyl group, an ethylsilyl group, etc.

Among these alkylsilyl groups, an alkylsilyl group having 1 to 10 carbon atoms is preferred, an alkylsilyl group having 1 to 6 carbon atoms is more preferred, and an alkylsilyl group having 1 to 3 carbon atoms is even more preferred.

The alkyl group, the cycloalkyl group, the alkenyl group, the aryl group and the alkylsilyl group that may be selected for $R^A$, $R^B$ and $R^C$ may further have a substituent.

Examples of the substituent include a halogen atom selected from a fluorine atom, a chlorine atom, a bromine atom, an iodine atom; a hydroxyl group; a nitro group; an amino group; a cyano group; a thiol group; an epoxy group; a glycidoxy group; a (meth)acryloyloxy group; an alkyl group having 1 to 6 carbon atoms (preferably 1 to 3 carbon atoms); a cycloalkyl group having 3 to 12 ring carbon atoms (preferably 6 to 10 ring carbon atoms); an aryl group having 6 to 12 ring carbon atoms; a heteroaryl group having 6 to 12 ring carbon atoms; an alkoxy group having 1 to 6 carbon atoms (preferably 1 to 3 carbon atoms); an aryloxy group having 6 to 12 ring carbon atoms, etc. These substituents may be further substituted with any other substituent.

However, the alkyl group, the cycloalkyl group, the alkenyl group, the aryl group and the alkylsilyl group that may be selected for $R^A$, $R^B$ and $R^C$ are unsubstituted.

The compound having a repeating unit represented by the above-mentioned general formula (1) may be an inorganic (poly)silazane compound composed of silicon atoms, nitrogen atoms and hydrogen atoms, and may also be an organic (poly)silazane compound containing carbon atoms along with silicon atoms, nitrogen atoms and hydrogen atoms.

Examples of the inorganic (poly)silazane compound include the following compounds (i) to (iii).

(i) A compound having a repeating unit of the above-mentioned general formula (1) where $R^A$, $R^B$ and $R^C$ are all hydrogen atoms (for example, compounds described in JP 63-16325B).

(ii) A compound having a repeating unit represented by the following general formula (2).

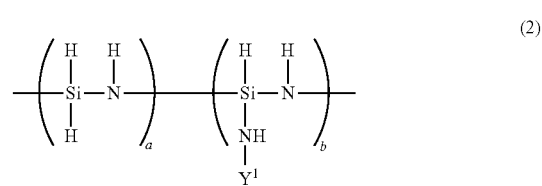

(2)

wherein a and b each independently indicate an integer of 1 or more; and $Y^1$ represents a hydrogen atom or a group represented by the following general formula (2a).

(2a)

wherein c indicates an integer of 1 or more. * indicates a bonding position, and $Y^2$ represents a hydrogen atom or a group represented by the above formula (2a).

(iii) A compound having a structure represented by the following formula (3).

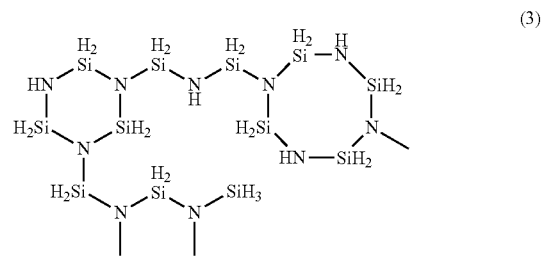

(3)

Examples of the organic (poly)silazane compound include the following compounds (iv) to (viii).

(iv) A compound having a cyclic structure with a repeating unit represented by the above general formula (1) where $R^A$ is the above-mentioned group except a hydrogen atom, and $R^B$ and $R^C$ are hydrogen atoms (its polymerization degree is preferably 3 to 5).

(v) A compound having a cyclic structure with a repeating unit represented by the above general formula (1) where $R^A$ and $R^C$ each are the above-mentioned group except a hydrogen atom, and $R^B$ is a hydrogen atom (its polymerization degree is preferably 3 to 5).

(vi) A compound having a cyclic structure with a repeating unit represented by the above general formula (1) where $R^A$ and $R^B$ each are the above-mentioned group except a hydrogen atom, and $R^C$ is a hydrogen atom (its polymerization degree is preferably 3 to 5).

(vii) A compound having a structure represented by the following general formula (4).

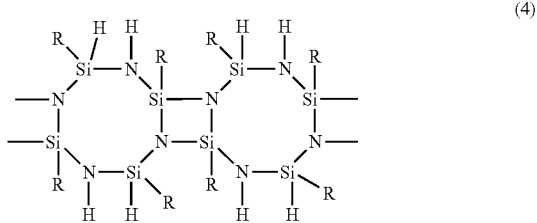

(4)

wherein R represents an alkyl group having 1 to 6 carbon atoms, and is preferably a methyl group.

(viii) A compound having a repeating unit represented by the following general formula (5).

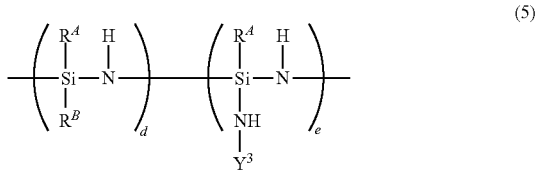

(5)

wherein $R^A$ and $R^B$ are the same as $R^A$ and $R^B$ in the above general formula (1), d and e each independently indicate an integer of 1 or more, $Y^3$ represents a hydrogen atom or a group represented by the following general formula (5a).

(5a)

wherein f indicates an integer of 1 or more, * indicates a bonding position, $Y^4$ represents a hydrogen atom or a group represented by the above general formula (5a).

Examples of other (poly)silazane compounds than the compounds having a repeating unit represented by the above general formula (1) include 1,1,1,3,3,3-hexamethyldisilazane, 1,3-bis(chloromethyl)tetramethyldisilazane, 1,3-bis(3, 3,3-trifluoropropyl)-1,1,3,3-tetramethyldisilazane, 1,3-diphenyltetramethyldisilazane, 1,3-divinyl-1,1,3,3-tetramethyldisilazane, 1,1,3,3-tetramethyldisilazane, etc.

The (poly)silazane compound for use in the present invention may also be a modified polysilazane derivative.

Among these (poly)silazane compounds, inorganic (poly)silazane compounds are preferred, and inorganic (poly)silazane compounds having a repeating unit of the above general formula (1) where $R^A$ to $R^C$ are all hydrogen atoms are more preferred.

As the (poly)silazane compound for use in the present invention, commercial products that are commercially available as glass coating materials may be used directly as they are.

One alone or two or more of (poly)silazane compounds may be used either singly or as combined.

The number-average molecular weight (Mn) of the (poly)silazane compound is preferably 100 to 50000, more preferably 300 to 10000, even more preferably 500 to 5000.

<Other Additives>

The interlayer may contain any other additive within a range not detracting from the advantageous effects of the present invention, along with the above-mentioned (poly)silazane compound.

Examples of the other additives include a resin component not corresponding to (poly)silazane compounds, a curing agent, an anti-aging agent, a light stabilizer, a flame retardant, an electroconductive agent, etc.

The resin component includes a polymer having a number-average molecular weight of 1000 or more not corresponding to the above-mentioned (poly)silazane compounds, and examples of the polymer include an acrylic resin, an urethane resin, a polyester resin, a silicone resin, a rubber resin, etc.

The resin component also includes a polymer that is formed through polymerization of a polymerizing compound by heating or energy irradiation.

The polymerizing compound includes (meth)acryloyl group-having compounds, concretely (meth)acrylate compounds having such a property that the polymerization thereof can be accelerated through energy ray irradiation with UV rays, electron rays, etc.

Examples of the (meth)acrylate compound include trimethylolpropane tri(meth)acrylate, tetramethylolmethane tetra(meth)acrylate, pentaerythritol tri(meth)acrylate, dipentaerythritol monohydroxy-penta(meth)acrylate, dipentaerythritol hexa(meth)acrylate, 1,4-butylene glycol di(meth)acrylate, 1,6-hexanediol di(meth)acrylate, polyethylene glycol di(meth)acrylate, etc.

The content of the (poly)silazane compound in the interlayer is, from the viewpoint of improving the curability of the antifouling layer and from the viewpoint of improving the interlayer adhesiveness between the interlayer and the antifouling layer, preferably 5 to 100% by mass relative to the total amount (100% by mass) of the interlayer, more preferably 10 to 100% by mass, even more preferably 50 to 100% by mass.

In the case where a (poly)silazane compound is the main component in the interlayer, the content of the (poly)silazane compound in the interlayer is, from the above-mentioned vie points preferably 50 to 100% by mass relative to the total amount (100% by mass) of the interlayer, more preferably 65 to 100% by mass, even more preferably 80 to 100% by mass, further more preferably 90 to 100% by mass.

In turn, in the case where a resin component not corresponding to (poly)silazane compounds is the main component in the interlayer, the content of the (poly)silazane compound in the interlayer is preferably 5 to 50% by mass, more preferably 5 to 45% by mass.

The content of a fluorine-containing compound in the interlayer is, from the viewpoint of the environment, preferably less than 10% by mass relative to the total mass (100% by mass) of the interlayer, more preferably less than 5% by mass, even more preferably less than 1% by mass, further more preferably less than 0.01% by mass.

[Adhesive Layer]

Examples of the adhesive to constitute the adhesive layer include an acrylic adhesive, an urethane adhesive, a silicone adhesive, a rubber adhesive, a polyester adhesive, a UV-curable adhesive, etc., which may be suitably selected in accordance with the use of the antifouling sheet.

One alone or two or more of these adhesives may be used either singly or as combined.

The thickness of the adhesive layer is not specifically limited, but is preferably 1 to 100 µm, more preferably 5 to 80 µm.

[Physical Properties of Antifouling Sheet]

The antifouling sheet of the present invention is provided with an antifouling layer having good surface state and curability, and has a large slip acceleration for water droplets, thereby having excellent water repellency that makes water droplets slip off instantly, and is excellent in interlayer adhesiveness.

When water droplets are dropped on the surface of the antifouling layer of the antifouling sheet of the present invention, the slip acceleration for water droplets is preferably 180 mm/s$^2$ or more, more preferably 190 mm/s$^2$ or more, even more preferably 230 mm/s$^2$ or more, further more preferably 450 mm/s$^2$ or more.

The value of slip acceleration for water droplets means the value calculated according to the method described in the section of Examples.

As described above, the antifouling layer that the antifouling sheet of the present invention has is a layer formed by drying and curing in an ammonia atmosphere. Accordingly, in general, ammonia is detected from the antifouling sheet of the present invention.

The ammonia concentration detected from the antifouling sheet of the present invention immediately after production thereof is generally 0.3 ppm or more. However, during long-term storage, ammonia could be released from the antifouling sheet, and the ammonia concentration may be less than 0.3 ppm as the case may be.

[Production Method for Antifouling Sheet]

The production method for the antifouling sheet of the present invention includes the following steps (1) to (3).

Step (1): a step of preparing an antifouling layer-forming composition containing 8 to 90 mol % of a silane compound (B) represented by the following formula (b) relative to 100 mol % of a silane compound (A) represented by the following formula (a), $$Si(OR^1)_p(X^1)_{4-p} \quad \text{Formula (a)}$$

wherein $R^1$ represents an alkyl group having 1 to 6 carbon atoms, $X^1$ represents a halogen atom, when the formula has plural $R^1$'s and $X^1$'s, the plural $R^1$'s and $X^1$'s each may be the same as or different from each other, p indicates an integer of 0 to 4, $$R^2Si(OR^3)_q(X^2)_{3-q} \quad \text{Formula (b)}$$

wherein $R^2$ represents an unsubstituted or substituted alkyl group having 4 to 14 carbon atoms, $R^3$ represents an alkyl group having 1 to 6 carbon atoms, $X^2$ represents a halogen atom, when the formula has plural $R^3$'s and $X^2$'s, the plural $R^3$'s and $X^2$'s each may be the same as or different from each other, q indicates an integer of 0 to 3, Step (2): a step of forming a coating film using the antifouling layer-forming composition prepared in the step (1), Step (3): a step of forming an antifouling layer by drying and curing the coating film formed in the step (2), in an ammonia atmosphere.

<Step (1)>

The step (1) is a step of preparing an antifouling layer-forming composition.

The antifouling layer-forming composition contains a silane compound (A) represented by the above (a) and a silane compound (B) represented by the above formula (b), and preferably further contains an acid catalyst (C), and may contain any other additive than the components (A) to (C), within a range not detracting from the advantageous effects of the present invention.

The matters relating to the above formulae (a) and (b) as well as specific examples and preferred compounds for the components contained in the antifouling layer-forming composition, and the content of each component are the same as those described hereinabove in the section of the antifouling layer.

In the next step (2), it is preferable that a solvent is added to the antifouling layer-forming composition to provide a form of a solution thereof for facilitating formation of a coating film.

Examples of the solvent include alcohols having 1 to 4 carbon atoms such as methanol, ethanol, n-propanol, isopropyl alcohol, butanol, etc.; ethyl acetate; methyl ethyl ketone; methyl isobutyl ketone; toluene; xylene; etc. One alone or two or more of these solvents may be used either singly or as combined.

<Step (2)>

The step (2) is a step of forming a coating film using the antifouling layer-forming composition prepared in the step (1).

The coating film may be formed not only on a substrate or on a release-treated surface of a release material but also on the interlayer containing a (poly)silazane compound provided on the substrate or the release material.

Preferably, the interlayer is formed according to a method where a solvent is added to an interlayer-forming composition that contains a (poly)silazane compound and any other optional additive to prepare a solution of the composition, and the solution is applied onto a substrate or onto the release-treated surface of a release material according to a known coating method, thereby forming a coating film thereon, and the coating film is dried.

Examples of the solvent to be added to the interlayer-forming composition include dibutyl ether, methyl ethyl ketone, methyl isobutyl ketone, ethyl acetate, cyclopentyl methyl ether, toluene, diethyl ether, mineral spirit, etc.

The method for forming a coating film using the above-mentioned antifouling layer-forming composition is not specifically limited, for example, including a coating method where a solution of the antifouling layer-forming composition is applied onto a substrate or onto a release-treated surface of a release material, or onto an interlayer according to a known coating method.

Examples of the coating method include a spin coating method, a spray coating method, a bar coating method, a knife coating method, a roll knife coating method, a roll coating method, a blade coating method, a die coating method, a gravure coating method, etc.

The coating method is also employable in forming a coating film using the above-mentioned interlayer-forming composition.

The operation in the step (2) may be carried out in an ammonia atmosphere, or in an environment where ammonia is not detected.

In the case where the coating film is formed on the interlayer containing a (poly)silazane compound, ammonia is continuously released from the interlayer, as described above, and therefore this step is carried out in an ammonia atmosphere.

<Step (3)>

The step (3) is a step of forming an antifouling layer by drying and curing the coating film formed in the step (2), in an ammonia atmosphere.

It is considered that, by drying the coating film in an ammonia atmosphere, ammonia could function as a catalyst for polycondensation of the component (A) and the component (B) thereby, as a result, improving the curability of the antifouling layer to be formed. On the other hand, when the coating film is dried in an environment where ammonia is not detected, the curability of the resultant antifouling layer is often insufficient.

The ammonia concentration in the ammonia atmosphere where the step (3) is carried out is, from the viewpoint of efficiently producing the antifouling sheet having an antifouling layer excellent in curability, preferably 0.3 ppm or more, more preferably 0.5 ppm or more, even more preferably 0.55 ppm or more, further more preferably 0.6 ppm or more.

The upper limit of the ammonia concentration is not specifically defined, but from the viewpoint of safety and handleability, the ammonia concentration is preferably 50 ppm or less, more preferably 30 ppm or less.

In the present step, the method for controlling the ammonia atmosphere having the above-mentioned ammonia concentration is not specifically limited, and, for example, there is mentioned a method of introducing a predetermined amount of ammonia into a drying furnace for controlling the concentration.

In the case where the coating film is formed on an interlayer containing a (poly)silazane compound, ammonia is continuously released from the interlayer as described above, and therefore it is unnecessary to dry the coating film in the drying furnace into which ammonia is introduced.

However, the interlayer immediately after formation thereof could release a large amount of ammonia, but with the lapse of time, the amount of ammonia to be released reduces. Accordingly, the interlayer is preferably within 60 days after formation, more preferably within 30 days after formation, even more preferably within 14 days after formation, further more preferably within 7 days after formation.

The drying temperature and the drying time are not specifically limited, and may be set in any desired manner.

EXAMPLES

The number-average molecular weight (Mn) of the component used in the following Examples, and the ammonia concentration in drying the coating film formed of the antifouling layer-forming composition were measured according to the methods mentioned below.

<Number-Average Molecular Weight (Mn)>

Using a gel permeation chromatography apparatus (trade name "HLC-8020", manufactured by Tosoh Corporation), measurement was carried out under the condition mentioned below to give a standard polystyrene-equivalent value of number-average molecular weight.

(Measurement Condition)

Column: "TSK guard column HXL-H", "TSK gel GMHXL (×2)" and "TSK gel G2000HXL" (all manufactured by Tosoh Corporation) connected in series.

Column temperature: 40° C.

Developing solvent: tetrahydrofuran

Flow rate: 1.0 mL/min

<Ammonia Concentration in Drying Coating Film Formed of Antifouling Layer-Forming Composition>

Using a Kitagawa gas detector (trade name "No. 3L", manufactured by Gastec Corporation), the ammonia concentration in air in drying the coating film formed of an antifouling layer-forming composition was measured in the area around the coating film (in the space of up to a height of 3 cm from the surface of the coating film).

Production Example 1

Preparation of Antifouling Layer-forming Composition (1)

As the component (A), tetraethoxysilane (TEOS) (tetrafunctional silane compound of the formula (a) where p=4 and $R^1$=ethyl group) in an amount of 100 mol %, as the component (B) hexyltriethoxysilane (trifunctional silane compound of the formula (b) where q=3, $R^2$=n-hexyl group (carbon number: 6), and $R^3$=ethyl group) in an amount of 12.5 mol %, and as the component (C), 0.01 M hydrochloric acid in an amount of 0.053 mol % (as active component ratio) were blended and diluted with ethanol added thereto to prepare a solution of an antifouling layer-forming composition (1) having an effective component concentration of 1.8 M.

Production Example 2

Preparation of Antifouling Layer-forming Composition (2)

A solution of an antifouling layer-forming composition (2) having an effective component concentration of 1.8 M was prepared in the same manner as in Production Example 1 except that the amount of the component (B) was changed to 25.0 mol % relative to 100 mol % of the component (A).

Production Example 3

Formation of Interlayer-having Substrate

A polyethylene terephthalate (PET) film with a primer layer provided on one surface thereof (trade name "Cosmoshine A-4100" having a thickness of 50 μm, manufactured by Toyobo Co., Ltd.) was used as a substrate.

"Aquamica NL110A-20" (manufactured by Merck KGaA, solution containing 20 mass % polysilazane compound "perhydropolysilazane" (polysilazane compound of the general formula (1) where $R^A$, $R^B$, $R^C$=hydrogen atom, having a number-average molecular weight (Mn) of 2000) was applied onto the primer layer of the PET film, using a Mayer bar, to form a coating film thereon.

Next, the coating film was dried at 110° C. for 2 minutes to give an interlayer-having substrate having a interlayer containing a (poly)silazane compound and having a thickness of 1.5 μm.

Example 1

A polyethylene terephthalate (PET) film with a primer layer provided on one surface thereof (trade name "Cosmoshine A-4100" having a thickness of 50 μm, manufactured by Toyobo Co., Ltd.) was used as a substrate.

The solution of antifouling layer-forming composition (1) prepared in Production Example 1 was applied onto the primer layer of the PET film, in an atmosphere having an ammonia concentration of 0.6 ppm and using a Mayer bar, to form a coating film thereon in such a manner that the film thickness after drying could be 0.7 μm.

The coating film was dried and cured at 80° C. for 2 minutes in an atmosphere having an ammonia concentration of 0.6 ppm, thereby producing an antifouling sheet having an antifouling layer having a thickness of 0.7 μm.

Example 2

Using the interlayer-having substrate produced in Production Example 3, immediately after production (after left for 0 hour) thereof, the solution of antifouling layer-forming composition in Production Example 1 was applied to the substrate to form a coating film thereon, using a Mayer bar, in such a manner that the film thickness after drying could be 0.7 μm.

The coating film was dried and cured at 80° C. for 2 minutes to produce an antifouling sheet having an antifouling layer having a thickness of 0.7 μm. In drying the coating film, the ammonia concentration was 27 ppm.

Example 3

An antifouling sheet having an antifouling layer having a thickness of 0.7 μm was produced in the same manner as in Example 2, except that the interlayer-having substrate produced in Production Example 3 and left as such for 1 hour after its production was used. In drying the coating film, the ammonia concentration was 22 ppm.

Example 4

An antifouling sheet having an antifouling layer having a thickness of 0.7 μm was produced in the same manner as in Example 2, except that the interlayer-having substrate produced in Production Example 3 and left as such for 24 hours after its production was used. In drying the coating film, the ammonia concentration was 1.7 ppm.

Example 5

An antifouling sheet having an antifouling layer having a thickness of 0.7 μm was produced in the same manner as in Example 2, except that the interlayer-having substrate produced in Production Example 3 and left as such for 7 days after its production was used. In drying the coating film, the ammonia concentration was 0.6 ppm.

Example 6

An antifouling sheet having an antifouling layer having a thickness of 0.7 μm was produced in the same manner as in Example 2, except that the interlayer-having substrate produced in Production Example 3 and left as such for 14 days after its production was used. In drying the coating film, the ammonia concentration was 0.5 ppm.

Example 7

An antifouling sheet having an antifouling layer having a thickness of 0.7 μm was produced in the same manner as in Example 2, except that the interlayer-having substrate produced in Production Example 3 and left as such for 30 days after its production was used. In drying the coating film, the ammonia concentration was 0.1 ppm.

Example 8

An antifouling sheet was produced in the same manner as in Example 1, except that the solution of the antifouling layer-forming composition (2) prepared in Production Example 2 was used in place of the solution of the antifouling layer-forming composition (1).

Example 9

An antifouling sheet was produced in the same manner as in Example 2, except that the solution of the antifouling layer-forming composition (2) prepared in Production Example 2 was used in place of the solution of the antifouling layer-forming composition (1). In drying the coating film, the ammonia concentration was 27 ppm.

Example 10

An antifouling sheet was produced in the same manner as in Example 6, except that the solution of the antifouling layer-forming composition (2) prepared in Production Example 2 was used in place of the solution of the antifouling layer-forming composition (1). In drying the coating film, the ammonia concentration was 0.5 ppm.

Example 11

An antifouling sheet was produced in the same manner as in Example 7, except that the solution of the antifouling layer-forming composition (2) prepared in Production Example 2 was used in place of the solution of the antifouling layer-forming composition (1). In drying the coating film, the ammonia concentration was 0.1 ppm.

Comparative Example 1

An antifouling sheet having an antifouling layer having a thickness of 0.7 μm was produced in the same manner as in Example 1 but in an atmosphere where ammonia could not be detected. In drying the coating film, the ammonia concentration was 0 ppm.

Comparative Example 2

An antifouling sheet having an antifouling layer having a thickness of 0.7 μm was produced in the same manner as in Example 8 but in an atmosphere where ammonia could not be detected. In drying the coating film, the ammonia concentration was 0 ppm.

The antifouling layer-forming compositions and the antifouling sheets prepared and produced in the manner as above were evaluated for the characteristics thereof, according to the methods mentioned below. The results are shown in Table 1.

<Curability of Antifouling Layer>

The antifouling sheets produced in Examples and Comparative Examples were checked as to whether or not the coating film formed of the antifouling layer-forming composition therein was cured to form an antifouling layer.

In those in which the coating film was cured to form an antifouling layer therein, the surface of the antifouling layer was rubbed 20 times with a finger and then the color tone of the resultant antifouling layer was visually observed, and the curability of the antifouling layer was evaluated according to the following criteria.

A+: The coating film was fully cured to form an antifouling layer, and there was seen no change in color tone before and after rubbing the antifouling layer with a finger.

A: The coating film was fully cured to form an antifouling layer, and when the antifouling layer was rubbed with a finger, it whitened only slightly.

B: The coating film was fully cured to form an antifouling layer, and when the antifouling layer was rubbed with a finger, it whitened obviously.

C: The coating film formed of the antifouling layer-forming composition did not cure and an antifouling layer (cured layer) was not formed.

The antifouling sheets given the evaluation "C" are useless, and are therefore not evaluated in point of the following "slip acceleration" and "adhesiveness".

<Surface State of Antifouling Layer>

In the process of producing the antifouling sheets, the surface state of the coating film formed of the antifouling layer-forming composition and the surface state of the cured layer were visually observed, and the surface state of the antifouling layer was evaluated according to the following criteria.

A: No cissing was seen, and a good coating film was formed. In addition, the surface state of the antifouling layer formed by drying the coating film was also good.

B: Spot-like cissings having a diameter of 5 mm or less were seen in the formed coating film, but were on an acceptable level. In addition, the surface state of the antifouling layer formed by drying the coating film was relatively good.

C: Cissings having a diameter of 5 mm or more were seen in the formed coating film, and therefore the surface state of the antifouling layer formed by drying the coating film was poor, and the antifouling sheets were useless.

D: The formed coating film gelled partly in some sites, and the surface state of the antifouling layer formed by drying the coating film was poor, and the antifouling sheets were useless.

The antifouling sheets given the evaluation of "C" or "D" are useless, and are therefore not evaluated in point of the following "slip acceleration" and "adhesiveness".

<Measurement of Slip Acceleration>

The antifouling sheet produced in Examples and Comparative Examples was, while stretched in wet, put on a stage at a tilt angle of 35 degrees in such a manner that the antifouling layer thereof could be exposed out, and 30 µl of pure water was dropped onto the antifouling layer of the antifouling sheet, thereby determining the relationship between the pure water slip distance and the slip time.

From the resultant relationship between the slip distance and the slip time, the slip distance per unit time was differentiated, the speed change per unit time was calculated, further the speed change per unit time was differentiated, and the acceleration (slip acceleration) was calculated from the resultant regression line. Table 1 shows a value of the calculated slip acceleration. When the slip acceleration is 180 mm/s$^2$ or more, the antifouling performance of the antifouling sheet can be said to be good.

<Measurement of Interlayer Adhesiveness>

The antifouling sheets produced in Examples and Comparative examples were evaluated for the interlayer adhesiveness thereof according to a cross-cut adhesion test of JIS K5400. Table 1 shows the number of unpeeled crosscuts per 100 crosscuts tested.

TABLE 1

| | Antifouling Layer | | | | | | | Interlayer | |
|---|---|---|---|---|---|---|---|---|---|
| | Antifouling Layer-Forming Composition | | | | | | Thickness | (Poly)silazane | Thickness |
| | Component (A) | | Component (B) | | Component (C) | | | | |
| | kind | mol % | kind | mol % | kind | mol % | (µm) | Compound | (µm) |
| Example 1 | TEOS | 100 | hexyltriethoxysilane | 12.5 | hydrochloric acid | 0.053 | 0.7 | — | 0 |
| Example 2 | TEOS | 100 | hexyltriethoxysilane | 12.5 | hydrochloric acid | 0.053 | 0.7 | perhydropolysilazane | 1.5 |
| Example 3 | TEOS | 100 | hexyltriethoxysilane | 12.5 | hydrochloric acid | 0.053 | 0.7 | perhydropolysilazane | 1.5 |
| Example 4 | TEOS | 100 | hexyltriethoxysilane | 12.5 | hydrochloric acid | 0.053 | 0.7 | perhydropolysilazane | 1.5 |
| Example 5 | TEOS | 100 | hexyltriethoxysilane | 12.5 | hydrochloric acid | 0.053 | 0.7 | perhydropolysilazane | 1.5 |
| Example 6 | TEOS | 100 | hexyltriethoxysilane | 12.5 | hydrochloric acid | 0.053 | 0.7 | perhydropolysilazane | 1.5 |
| Example 7 | TEOS | 100 | hexyltriethoxysilane | 12.5 | hydrochloric acid | 0.053 | 0.7 | perhydropolysilazane | 1.5 |
| Example 8 | TEOS | 100 | hexyltriethoxysilane | 25.0 | hydrochloric acid | 0.053 | 0.7 | — | 0 |
| Example 9 | TEOS | 100 | hexyltriethoxysilane | 25.0 | hydrochloric acid | 0.053 | 0.7 | perhydropolysilazane | 1.5 |
| Example 10 | TEOS | 100 | hexyltriethoxysilane | 25.0 | hydrochloric acid | 0.053 | 0.7 | perhydropolysilazane | 1.5 |
| Example 11 | TEOS | 100 | hexyltriethoxysilane | 25.0 | hydrochloric acid | 0.053 | 0.7 | perhydropolysilazane | 1.5 |
| Comparative Example 1 | TEOS | 100 | hexyltriethoxysilane | 12.5 | hydrochloric acid | 0.053 | 0.7 | — | 0 |
| Comparative Example 2 | TEOS | 100 | hexyltriethoxysilane | 25.0 | hydrochloric acid | 0.053 | 0.7 | — | 0 |

| | Interlayer-Having Substrate Standing Time | Ammonia Concentration in Drying Coating Film formed of antifouling layer-forming composition (ppm) | Evaluation Items | | | |
|---|---|---|---|---|---|---|
| | | | Curability of Antifouling Layer | Surface Slate of Antifouling Layer | Slip Acceleration (mm/s$^2$) | Interlayer Adhesiveness (unpeeled crosscuts/100 crosscuts) |
| Example 1 | — | 0.6 | A+ | A | 205 | 100 |
| Example 2 | 0 hr (immediately after production) | 27 | A+ | A | 199 | 100 |

TABLE 1-continued

| Example | Time | Value | Surface | Curability | Slip | Adhesion |
|---|---|---|---|---|---|---|
| Example 3 | 1 hr | 22 | A+ | A | 211 | 100 |
| Example 4 | 24 hrs | 1.7 | A+ | A | 196 | 100 |
| Example 5 | 7 days | 0.6 | A+ | A | 203 | 100 |
| Example 6 | 14 days | 0.5 | A | A | 191 | 100 |
| Example 7 | 30 days | 0.1 | B | A | 182 | 100 |
| Example 8 | — | 0.6 | A+ | A | 555 | 100 |
| Example 9 | 0 hr (immediately after production) | 27 | A+ | A | 550 | 100 |
| Example 10 | 14 days | 0.5 | A | A | 538 | 100 |
| Example 11 | 30 days | 0.1 | B | A | 525 | 100 |
| Comparative Example 1 | — | 0 | C | A | —(*) | —(*) |
| Comparative Example 2 | — | 0 | C | A | —(*) | —(*) |

(*)Since at least one of "surface state of antifouling layer" and "curability of antifouling layer" was poor, the test was finished without evaluating the "slip acceleration" and the "interlayer adhesiveness".

As in Table 1, the antifouling sheets produced in Examples 1 to 11 were excellent in curability of the antifouling layer, and the surface state of the antifouling layer therein was good. In addition, the slip acceleration for water droplets on these antifouling sheets was large, and therefore the antifouling sheets had excellent water repellency capable of slipping off water droplets instantly and had good interlayer adhesiveness.

On the other hand, the antifouling sheets produced in Comparative Examples 1 and 2 were poor in the curability of the antifouling layer therein. Accordingly, it was judged that these antifouling sheets were useless, and therefore the antifouling sheets were not evaluated for the slip acceleration and the adhesiveness thereof.

INDUSTRIAL APPLICABILITY

The antifouling sheet of the present invention is provided with an antifouling layer having good surface state and curability, and has a large slip acceleration for water droplets, thereby having excellent water repellency that makes water droplets slip off instantly. In addition, the antifouling sheet has excellent interlayer adhesiveness.

Accordingly the antifouling sheet of the present invention is favorable, for example, as an antifouling sheet for preventing water droplets, stains and the like that may hinder vision, from adhering to the surfaces of windows for buildings, windows for automobiles, windshields for cars, airplanes, ships and the like, aquariums, ship bottom windows, undersea lives adhesion preventing films for ship bottoms, road panels such as soundproof walls and the like, mirrors installed in bathrooms and the like, and molded articles such as glass chambers, glass accessories and the like, and is more favorable for applications that require water repellency capable of instantaneously slipping off water droplets, such as for windows for automobiles, windshields for cars, airplanes, ships and the like, etc.

REFERENCE SIGNS LIST 1a, 1b, 1c, 1d, 2a, 2b, 2c, 2d Antifouling Sheet
11 Antifouling Layer
12 Substrate
12a Primer Layer
13 Interlayer
14 Adhesive Layer
15, 15' Release Material

The invention claimed is:

1. A method for producing an antifouling sheet, the method comprising:
preparing an antifouling layer-forming composition comprising 8 to 90 parts in moles of a silane compound (B) of formula (b) relative to 100 parts in moles of a silane compound (A) of formula (a), $$Si(OR^1)_p(X^1)_{4-p} \quad \text{Formula (a)}$$

wherein each $R^1$ independently represents an alkyl group comprising 1 to 6 carbon atoms, each $X^1$ independently represents a halogen atom, and p is an integer of 0 to 4, $$R^2Si(OR^3)_q(X^2)_{3-q} \quad \text{Formula (b)}$$

wherein $R^2$ represents an unsubstituted or substituted alkyl group comprising 4 to 14 carbon atoms, each $R^3$ independently represents an alkyl group comprising 1 to 6 carbon atoms, each $X^2$ independently represents a halogen atom, and q is an integer of 0 to 3,
wherein a substituent of an alkyl group of $R^2$ is at least one substituent selected from the group consisting of a chlorine atom, a bromine atom, an iodine atom, a hydroxyl group, a nitro group, an amino group, a cycloalkyl group having 3 to 10 ring carbon atoms and an aryl group having 6 to 12 ring carbon atoms when $R^2$ represents a substituted alkyl group,
forming a coating film using the antifouling layer-forming composition,
forming an antifouling layer by drying and curing the coating film in an ammonia atmosphere.

2. The method according to claim 1, wherein the ammonia atmosphere has an ammonia concentration of 0.3 ppm or more.

3. The method according to claim 1, wherein the antifouling layer-forming composition further comprises an acid catalyst (C).

4. The method according to claim 3, wherein the acid catalyst (C) comprises one or more acid selected from the group consisting of hydrochloric acid, phosphoric acid, acetic acid, formic acid, sulfuric acid, methanesulfonic acid, hydrobromic acid, p-toluenesulfonic acid, and trifluoroacetic acid.

5. The method according to claim 3, wherein a total content of the compound (A), the compound (B) and the acid catalyst (C) in the antifouling layer-forming composition is 50 to 100% by mass relative to a total amount of the antifouling layer-forming composition.

6. The method according to claim 1, wherein the substituent of an alkyl group of $R^2$ is a chlorine atom.

7. The method according to claim 1, wherein the substituent of an alkyl group of $R^2$ is a bromine atom.

8. The method according to claim 1, wherein the substituent of an alkyl group of $R^2$ is an iodine atom.

9. The method according to claim 1, wherein the substituent of an alkyl group of $R^2$ is a hydroxyl group.

10. The method according to claim 1, wherein the substituent of an alkyl group of $R^2$ is a nitro group.

11. The method according to claim 1, wherein the substituent of an alkyl group of $R^2$ is an amino group.

12. The method according to claim 1, wherein the substituent of an alkyl group of $R^2$ is a cycloalkyl group having 3 to 10 ring carbon atoms.

13. The method according to claim 1, wherein the substituent of an alkyl group of $R^2$ is an aryl group having 6 to 12 ring carbon atoms.

* * * * *